R. C. NEWHOUSE.
STEERING DEVICE.
APPLICATION FILED OCT. 28, 1918.

1,425,678.

Patented Aug. 15, 1922.

Inventor
R. C. Newhouse
by
Attorney

UNITED STATES PATENT OFFICE.

RAY C. NEWHOUSE, OF WAUWATOSA, WISCONSIN, ASSIGNOR TO ALLIS-CHALMERS MANUFACTURING COMPANY, OF MILWAUKEE, WISCONSIN, A CORPORATION OF DELAWARE.

STEERING DEVICE.

1,425,678.  Specification of Letters Patent.  Patented Aug. 15, 1922.

Application filed October 28, 1918. Serial No. 263,423.

*To all whom it may concern:*

Be it known that I, RAY C. NEWHOUSE, a citizen of the United States, residing at Wauwatosa, in the county of Milwaukee and State of Wisconsin, have invented a certain new and useful Improvement in Steering Devices, of which the following is a specification.

This invention relates in general to improvements in the construction and operation of steering devices for vehicles, and relates specifically to means for facilitating manipulation of the steering mechanisms of motor vehicles.

An object of the invention is to provide a steering device which is simple in construction and efficient in operation. Another object is to provide a device which will facilitate manipulation of steering mechanisms. A further object is to provide a multi-speed steering device which is compact in structure. Still another object is to provide readily accessible means for changing the force required for manipulation of a steering mechanism. Other objects and advantages of the invention will be apparent from the following description.

It has been found, especially in the manipulation of relatively large and heavy trucks, that it is difficult under certain conditions, to turn a steering wheel of the ordinary diameter to effect turning of the vehicle. This difficulty is enhanced by various conditions such as muddy or uneven roads or excessive loading of the vehicle. It is undesirable to make the steering wheel of excessively large diameter or to introduce speed-changing gearing for normal operation, since such structures necessitate excessive movement of the steering wheel during normal steering operation. In order to facilitate manipulation of the steering wheel under extraordinary conditions of operation of the vehicle, and without necessitating undesirable enlargement of the steering wheel, the present invention contemplates the provision of means whereby the rate of turning of the steering wheel for a predetermined degree of turning of the vehicle, is increased while the force required to turn the steering wheel is proportionally decreased. In this manner the steering operation is greatly facilitated and a relatively small force acting through a relatively great distance, is caused to accomplish the same result or work that may be accomplished by a greater force acting through a smaller distance, so long as the product of the force and distance remains equal.

A clear conception of an embodiment of the invention may be had by referring to the drawing accompanying and forming a part of this specification in which like reference characters designate the same or similar parts in the various views.

Figure 1:
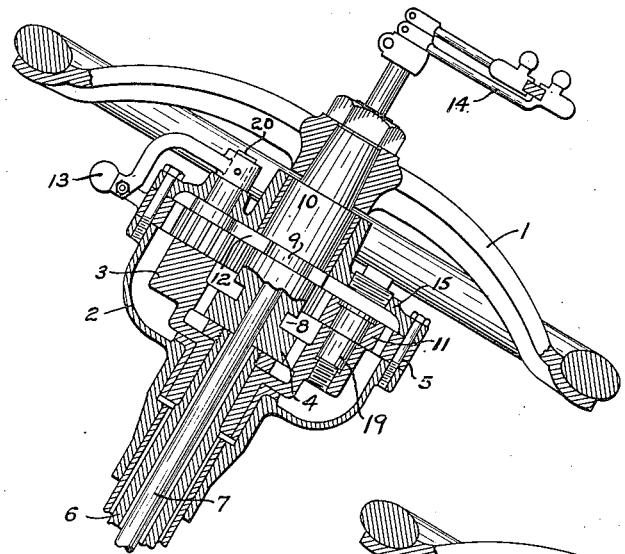
Fig. 1 is a transverse vertical section through a steering mechanism showing the same in normal running position.

The steering gear comprises in general a stationary casing 2 secured to the upper extremity of a stationary hollow supporting shaft, a steering column or shaft 6 rotatably supported in the casing 2, a manually operable steering wheel 1 manipulable from the driver's seat, motor control connections 7 extending downwardly through the interior of the steering column 6, and control levers and mechanism associated with the upper extremity of the control connections 7. Secured to the upper extremity of the steering column 6 is a movable frame 3 having an annular series of clutch teeth 17 formed integral therewith. These clutch teeth 17 normally mesh with the teeth of a central gear 4 formed integral with the central movable member or shaft 10, thereby producing a direct jaw clutch connection between the shaft 10 and the steering column 6. The steering wheel 1 is fixedly secured to the upper extremity of the shaft 10 by any suitable means.

Figure 3:
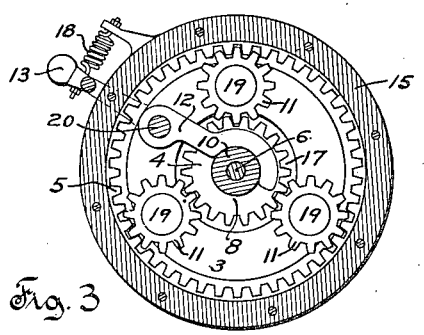
Fig. 3 is a transverse section through the steering gear, the section being taken along the line III—III of Fig. 2 looking toward the column shaft.

The shaft 10 is maintained in alinement with the steering column 6 by means of a relatively long bearing formed in the top plate 15 which is secured to the casing 2 by means of a series of bolts. The shaft 10 is provided with a pair of spaced annular recesses or grooves 8, 9, the lower recess 8 being directly adjacent the gear 4 and the upper recess being directly below the bearing of the shaft 10 when this shaft is in normal position. The top plate 15 also provides a bearing for a latch shaft 20 to the lower extremity of which is secured a locking latch 12 adapted to interchangeably coact with the recesses 8, 9, and to the upper extremity of which is secured a latch manipulating lever 13. A spring 18 shown in Fig. 3, serves to connect the lever 13 with a projection fixedly associated with the casing 2, and serves to at all times urge the latch 12 toward the central axis of the steering column 6.

The movable frame 3 has secured thereto three stub shafts 19 upon which pinions 11 are rotatably mounted. These pinions 11 mesh with the teeth of a stationary annular rack 5 which is fixedly secured to the casing 2 by being clamped between the top plate 15 and the casing 2. The pinions 11 are also adapted to mesh with the teeth of the gear 4 when this gear is adjusted to the position shown in Fig. 2. The interior of the casing 2 is ordinarily filled with grease or other lubricant which may be admitted upon removal of a plug 16 associated with the top plate 15.

During normal operation of the device the elements are positioned as shown in Fig. 1. The gear 4 has its teeth in direct engagement with the clutch teeth 17 of the frame 3 and movement of the steering wheel 1 is communicated directly through the shaft 10, gear 4 and frame 3 to the steering column 6. Upward displacement of the steering wheel 1, shaft 10, and gear 4 is prevented by virtue of the latch 12 coacting with the upper annular recess 9 of the shaft 10.

Figure 2:
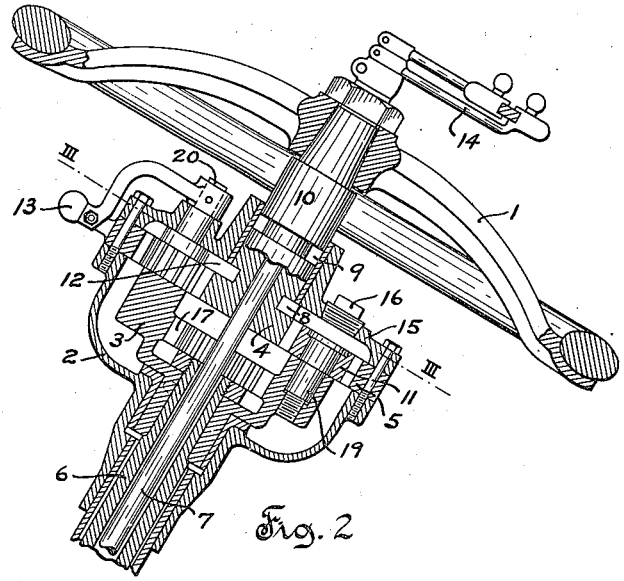
Fig. 2 is a transverse vertical section through a steering mechanism showing the same in an adjusted position.

If for any reason it is desired to change the relative speed of turning of the steering wheel 1 and steering column 6, the lever 13 may be thrown in an anti-clockwise direction as viewed in Fig. 2 to withdraw the latch 12 from the upper recess 9. The steering wheel 1, shaft 10 and gear 4 may then be raised to bring the teeth of the gear 4 into mesh with the teeth of the pinions 11 as shown in Fig. 2. Upon releasing the lever 13, the spring 18 will urge the latch 12 into engagement with the lower recess 8 of the shaft 10 thereby holding the parts in the adjusted position. With the elements thus positioned, it will be noted that it will require a greater extent of turning of the steering wheel 1 in order to produce a predetermined degree of turning of the steering column 6. The force required to turn the steering wheel 1 will however be proportionally lessened.

It will thus be noted that if for any reason turning of the steering wheel 1 becomes too difficult with the elements in the position shown in Fig. 1, the force required to manipulate the wheel 1, may readily be reduced by adjusting the parts to the position shown in Fig. 2. The control connections 7 are made of sufficient length to permit adjustment of the parts to produce the change-speed in steering. The elements for producing this change are also readily accessible by the driver.

While the device has been disclosed as applied specifically to the steering gear of a motor vehicle, it will be apparent that the principles of the invention are readily applicable to other devices. The result accomplished is the same as if the steering wheel were made of larger diameter while the normal steering operation is not affected.

It should be understood that it is not desired to limit the invention to the exact details herein shown and described for obvious modifications within the scope of the appended claims may occur to persons skilled in the art.

It is claimed and desired to secure by Letters Patent:

1. In a steering device, a manually operable steering element, a second element movable by said steering element, speed ratio-changing mechanism between said elements, said mechanism including a gear, and supporting structure for said steering element adapted to permit axial movement thereof and thereby to effect movement of said gear to interchangeably connect said elements in different speed ratios through a single set of teeth of said gear.

2. In a steering device, a manually operable steering element, a second element movable by said steering element, speed ratio-changing mechanism between said elements, said mechanism including a gear secured to said steering element, and supporting structure for said steering element adapted to permit axial movement thereof and thereby to effect movement of said gear to interchangeably connect said elements in different speed ratios through a single set of teeth of said gear.

3. In a steering device, a manually operable steering element, a second element coaxial with and movable by said steering element, speed ratio-changing mechanism between said elements, said mechanism including a gear, and supporting structure for said steering element adapted to permit axial movement thereof and thereby to effect movement of said gear to interchangeably connect said elements in different speed ratios through a single set of teeth of said gear.

4. In a steering device, a manually operable steering element, a gear movable by said element, a column shaft, speed changing gearing, and means operable by said steering element for directly connecting said gear and said shaft and for interchangeably connecting said gear and said shaft through said gearing and means for locking said gear in either of said positions.

5. In a steering device, a steering wheel, a gear secured to said wheel, a column shaft, speed reducing gearing, and means operable by said steering element for directly connecting said gear and said shaft and for interchangeably connecting said gear and said shaft through said gearing and means for locking said gear in either of said positions.

6. In a steering device, a manually operable steering element, a shaft element, a pinion rotatably associated with one of said elements, means comprising a gear and a clutch member for directly connecting said elements, said gear being movable by said steering element into coaction with said pinion, and means for locking said gear in either of said positions.

7. In a steering device, a manually operable steering element, a column shaft, means comprising a gear for coacting with said shaft to directly connect said element and said shaft, a pinion directly connected with said shaft, said pinion and said gear being relatively movable by said steering element to effect coaction between said gear and said pinion, and means for locking said gear in either of said two positions of coaction.

8. In a steering device, a steering wheel, a column shaft, means comprising a gear associated with said wheel and a clutch member associated with said column shaft for directly connecting said wheel and said shaft, a pinion rotatably associated with said shaft, a stationary rack coacting with said pinion, and means operable by said steering wheel for disengaging the connection between said gear and said clutch member and for effecting coaction between said gear and said pinion.

9. In a steering device, a steering wheel, a column shaft, means comprising a gear associated with said wheel and a clutch member associated with said column shaft for directly connecting said wheel and said shaft, a pinion rotatably associated with said shaft, a stationary annular rack coacting with said pinion, means operable by said steering wheel for effecting coaction between said gear and said pinion, and latch means for holding said gear either in engagement with said clutch member or with said pinion.

10. In a steering device, a steering wheel rotatable about an axis, a gear secured to said wheel, a column shaft, a clutch element associated with said column shaft, speed reducing gearing associated with said column shaft, and means for effecting axial shifting of said steering wheel and of said gear to interchangeably connect said gear with said clutch element and with said speed reducing gearing.

11. In a steering device, a manually operable steering element, a second element coaxial with and movable by said steering element, speed ratio-changing mechanism between said elements, said mechanism including a gear, and means for axially moving one of said elements to move said gear to interchangeably connect said elements in different speed ratios.

12. In a steering device, a manually operable steering element, a second element coaxial with and movable by said steering element, speed ratio-changing mechanism between said elements, said mechanism including a gear secured to said steering element, and means for effecting axial shifting of said steering element to move said gear to interchangeably connect said elements in different speed ratios.

13. In a steering device, a manually operable steering element, a second element movable by said steering element, and speed-ratio-changing mechanism comprising a gear which is movable by one of said elements to interchangeably connect said elements in different speed ratios through a single set of teeth of said gear.

14. In a steering device, a manually operable steering element, a second element movable by said steering element, and speed-ratio-changing mechanism between said elements, said mechanism comprising a gear associated with and movable by one of said elements to interchangeably connect said elements in different speed ratios.

15. In a steering device, a manually operable steering element, a second element movable by said steering element, and speed-ratio-changing mechanism between said elements, said mechanism comprising a gear relatively movable axially by one of said elements with reference to the remainder of said mechanism to interchangeably connect said elements in different speed ratios.

In testimony whereof, the signature of the inventor is affixed hereto.

RAY C. NEWHOUSE.